US011269212B2

(12) United States Patent
Fuchida et al.

(10) Patent No.: US 11,269,212 B2
(45) Date of Patent: Mar. 8, 2022

(54) POLARIZER, METHOD OF PRODUCING POLARIZER, AND OPTICAL LAMINATE INCLUDING THE POLARIZER

(71) Applicant: NITTO DENKO CORPORATION, Baraki (JP)

(72) Inventors: Takehito Fuchida, Ibaraki (JP); Shusaku Goto, Ibaraki (JP); Katsunori Takada, Ibaraki (JP); Yoshitsugu Kitamura, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

(21) Appl. No.: 16/127,585

(22) Filed: Sep. 11, 2018

(65) Prior Publication Data

US 2019/0079347 A1    Mar. 14, 2019

(30) Foreign Application Priority Data

Sep. 14, 2017 (JP) .............................. JP2017-176798

(51) Int. Cl.
*G02F 1/1335* (2006.01)
*G02B 5/30* (2006.01)
(Continued)

(52) U.S. Cl.
CPC ..... *G02F 1/133528* (2013.01); *G02B 5/0242* (2013.01); *G02B 5/3025* (2013.01);
(Continued)

(58) Field of Classification Search
CPC ......... G02F 1/133528; G02F 1/133504; G02B 5/0242; G02B 5/30; G02B 5/3025;
(Continued)

(56) References Cited

U.S. PATENT DOCUMENTS 9,632,218 B2   4/2017  Liu et al.
10,101,514 B2  10/2018 Goto et al.
(Continued)

FOREIGN PATENT DOCUMENTS

CN      1670594 A    9/2005
CN    105542672 A    5/2016
(Continued)

OTHER PUBLICATIONS

Office Action dated Jul. 8, 2019, issued in counterpart KR application No. 10-2018-0109847, with English translation (15 pages).
(Continued)

*Primary Examiner* — Kristina M Deherrera
(74) *Attorney, Agent, or Firm* — Westerman, Hattori, Daniels & Adrian, LLP

(57) ABSTRACT

An object of the present invention is to provide a polarizer having a neutralized hue without any increase in transmittance. A polarizer of the present invention having a transmittance parameter represented by the equation (1) of 0.8 or more and a hue parameter represented by the equation (2) of 5 or less:

$$\text{Transmittance parameter} = T_{420}/T_{550} \quad (1)$$

in the equation (1), $T_{420}$ represents a parallel transmittance at a wavelength of 420 nm and $T_{550}$ represents a parallel transmittance at a wavelength of 550 nm;

$$\text{Hue parameter} = (a^2 + b^2) \quad (2)$$

in the equation (2), a represents a parallel hue value 'a' and b represents a parallel hue value 'b'.

13 Claims, 4 Drawing Sheets

(51) Int. Cl.
 *G02B 5/02* (2006.01)
 *G02F 1/13363* (2006.01)
(52) U.S. Cl.
 CPC ..... *G02B 5/3083* (2013.01); *G02F 1/133504* (2013.01); *G02F 1/13363* (2013.01); *G02F 1/133553* (2013.01); *G02F 1/133638* (2021.01); *G02F 2203/01* (2013.01); *G02F 2203/02* (2013.01); *G02F 2413/01* (2013.01)
(58) Field of Classification Search
 CPC .. G02B 5/3083; G02B 5/3033; G02B 5/3041; G02B 5/305
 USPC .................................. 359/487.01, 487.02
 See application file for complete search history.

(56) References Cited

U.S. PATENT DOCUMENTS

| 10,126,468 | B2 | 11/2018 | Mochizuki | |
|---|---|---|---|---|
| 2007/0279741 | A1* | 12/2007 | Yoshioka | G02B 5/0242 359/487.02 |
| 2009/0279030 | A1* | 11/2009 | Toyama | C08G 18/61 349/117 |
| 2010/0232024 | A1 | 9/2010 | Murota et al. | |
| 2015/0043070 | A1 | 2/2015 | Kitagawa et al. | |
| 2016/0025906 | A1 | 1/2016 | Liu et al. | |
| 2016/0107425 | A1 | 4/2016 | Forier et al. | |
| 2016/0377772 | A1 | 12/2016 | Goto et al. | |
| 2017/0015361 | A1 | 1/2017 | Koch et al. | |
| 2017/0090085 | A1 | 3/2017 | Goto et al. | |

FOREIGN PATENT DOCUMENTS

| CN | 106104325 A | 11/2016 |
|---|---|---|
| CN | 106461846 A | 2/2017 |
| CN | 106687832 A | 5/2017 |
| CN | 106896437 A | 6/2017 |
| CN | 106967308 A | 7/2017 |
| JP | H11-281817 A | 10/1999 |
| JP | 2002-258042 A | 9/2002 |
| JP | 2002-258043 A | 9/2002 |
| JP | 2004-4149 A | 1/2004 |
| JP | 2010-039170 A | 2/2010 |
| JP | 2013-210624 A | 10/2013 |
| JP | 2015-036729 A | 2/2015 |
| JP | 2016-129961 A | 7/2016 |
| JP | 2017-067858 A | 4/2017 |
| KR | 10-2016-0129063 A | 11/2016 |
| TW | 201726822 A | 8/2017 |
| WO | 2015-137514 A1 | 9/2015 |

OTHER PUBLICATIONS

Office Action dated May 29, 2019, issued in counterpart TW Application No. 107129662, with English translation (8 pages).
Office Action dated Sep. 1, 2020, issued in counterpart JP Application No. 2017-176798, with English Translation. (9 pages).
Office Action dated Aug. 27, 2020, issued in counterpart CN Application No. 201811072625.3, with English translation (17 pages).
Office Action dated Apr. 28, 2021, issued in counterpart CN application No. 201811072625.3 with English machine translation. (15 pages).
Office Action dated Mar. 23, 2021, issued in counterpart JP Application No. 2017-176798, with English Translation. (8 pages).
Office Action dated Nov. 12, 2021, issued in counterpart CN Application No. 201811072625.3 with English machine translation. (14 pages).

* cited by examiner

POLARIZER, METHOD OF PRODUCING POLARIZER, AND OPTICAL LAMINATE INCLUDING THE POLARIZER

BACKGROUND OF THE INVENTION

This application claims priority under 35 U.S.C. Section 119 to Japanese Patent Application No. 2017-176798 filed on Sep. 14, 2017 which are herein incorporated by reference.

1. Field of the Invention

The present invention relates to a polarizer, a method of producing a polarizer, and an optical laminate including the polarizer.

2. Description of the Related Art

A polarizer has been used in a display apparatus, such as a liquid crystal display apparatus. In recent years, a polarizer having more excellent characteristics has been required. For example, a polarizer having a neutralized hue has been required for making the color of a display image clearer. However, when the hue of the polarizer is neutralized, the transmittance of the polarizer tends to increase. A polarizer having a high transmittance may cause a problem in terms of durability. In addition, a method of obtaining a polarizer having a neutral hue through the use of a dichroic substance having an absorption maximum in a specific wavelength range has been proposed (Japanese Patent Application Laid-open No. 2013-210624). Even when the hue is neutralized with such dichroic substance, the transmittance of the polarizer tends to increase. Accordingly, a polarizer having a neutralized hue without any increase in transmittance has been required.

SUMMARY OF THE INVENTION

The present invention has been made to solve the conventional problem, and an object of the present invention is to provide a polarizer having a neutralized hue without any increase in transmittance.

A polarizer of the present invention has a transmittance parameter represented by the equation (1) of 0.8 or more and a hue parameter represented by the equation (2) of 5 or less:

$$\text{Transmittance parameter} = T_{420}/T_{550} \quad (1)$$

in the equation (1), $T_{420}$ represents a parallel transmittance at a wavelength of 420 nm and $T_{550}$ represents a parallel transmittance at a wavelength of 550 nm;

$$\text{Hue parameter} = (a^2 + b^2) \quad (2)$$

in the equation (2), a represents a parallel hue value 'a' and b represents a parallel hue value 'b'.

In one embodiment of the present invention, the polarizer has a thickness of 8 μm or less.

In one embodiment of the present invention, the polarizer contains iodine as a dichroic substance.

According to another aspect of the present invention, a method of producing the polarizer is provided. The method includes subjecting a laminate of a thermoplastic resin substrate and a polyvinyl alcohol-based resin layer to in-air stretching treatment, dyeing treatment, underwater stretching treatment, and drying shrinkage treatment in the stated order. The polyvinyl alcohol-based resin layer contains a halide and a polyvinyl alcohol-based resin.

According to another aspect of the present invention, an optical laminate is provided. The optical laminate includes the polarizer; a retardation layer configured to substantially function as a λ/4 plate; and a light-diffusing layer.

In one embodiment of the present invention, the light-diffusing layer contains a pressure-sensitive adhesive and light-diffusing fine particles.

In one embodiment of the present invention, the light-diffusing fine particles have an average particle diameter of from 2 μm to 5 μm.

According to another aspect of the present invention, a liquid crystal display apparatus is provided. The liquid crystal display apparatus includes the optical laminate.

In one embodiment of the present invention, the liquid crystal display apparatus comprises a reflection-type liquid crystal display apparatus.

According to the present invention, the polarizer having a neutralized hue can be provided. In more detail, the polarizer of the present invention has a transmittance parameter of 0.8 or more and a hue parameter of 5 or less. The polarizer satisfying such parameters has a neutralized hue. In addition, the hue of the polarizer of the present invention can be neutralized by reducing the thickness of the polarizer. Accordingly, the hue can be neutralized without any increase in transmittance of the polarizer. Therefore, according to the present invention, there can be provided a polarizer having a desired transmittance and a neutralized hue. Further, a reduction in durability of the polarizer can be prevented.

DESCRIPTION OF THE EMBODIMENTS

Figure 1:
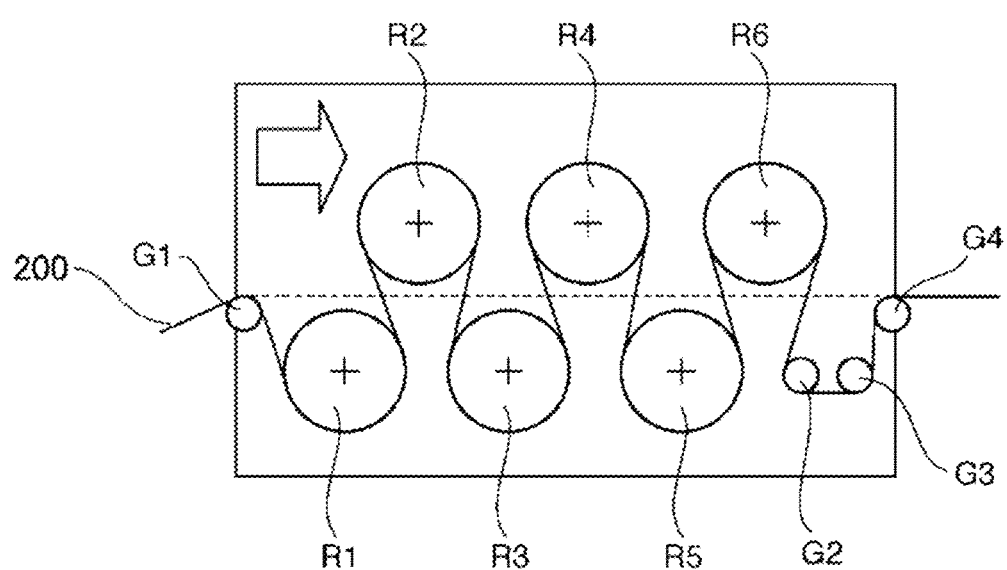
FIG. 1 is a schematic view for illustrating an example of drying shrinkage treatment with heated rolls.

Embodiments of the present invention are described below. However, the present invention is not limited to these embodiments.

Definitions of Terms and Symbols

The definitions of terms and symbols used herein are as described below.

(1) Refractive Indices (nx, ny, and nz)

"nx" represents a refractive index in a direction in which an in-plane refractive index is maximum (that is, slow axis direction), "ny" represents a refractive index in a direction perpendicular to the slow axis in the plane (that is, fast axis direction), and "nz" represents a refractive index in a thickness direction.

(2) In-Plane Retardation (Re)

"Re(550)" refers to the in-plane retardation of a film measured at 23° C. with light having a wavelength of 550 nm. The Re(550) is determined from the equation "Re=(nx−ny)×d" when the thickness of the film is represented by d (nm). "Re(450)" refers to the in-plane retardation of the film measured at 23° C. with light having a wavelength of 450 nm.

(3) Thickness Direction Retardation (Rth)

"Rth(550)" refers to the thickness direction retardation of a film measured at 23° C. with light having a wavelength of 550 nm. The Rth(550) is determined from the equation "Rth=(nx−nz)×d" when the thickness of the film is represented by d (nm). "Rth(450)" refers to the thickness direction retardation of the film measured at 23° C. with light having a wavelength of 450 nm.

(4) Nz Coefficient

An Nz coefficient is determined from the equation "Nz=Rth/Re".

A. Polarizer

A polarizer of the present invention has a transmittance parameter of 0.8 or more and a hue parameter of 5 or less. When the polarizer satisfies such parameters, a polarizer having a neutral hue is obtained.

The transmittance parameter is a value calculated from the following equation (1). In the equation (1), $T_{420}$ represents a parallel transmittance (H0) at a wavelength of 420 nm and $T_{550}$ represents a parallel transmittance (H0) at a wavelength of 550 nm. The transmittance parameter of the polarizer of the present invention is 0.8 or more, preferably 0.85 or more. The transmittance parameter is preferably as close to 1 as possible because the hue of the polarizer is more neutralized. The transmittance parameter is, for example, 1.0 or less. The parallel transmittances are values for the transmittances of a parallel laminated polarizer produced by superimposing two polarizers identical to each other so that their absorption axes may be parallel to each other. The parallel transmittances of the polarizer are measured with, for example, a spectrophotometer (manufactured by JASCO Corporation, product name: "V-7100"). Those transmittances are each a Y value subjected to visibility correction with the two-degree field of view (C light source) of JIS Z 8701-1982.

$$\text{Transmittance parameter} = T_{420}/T_{550} \quad (1)$$

The hue parameter is a value calculated from the following equation (2). In the equation (2), 'a' represents a parallel hue value 'a' and 'b' represents a parallel hue value 'b'. The hue parameter of the polarizer of the present invention is 5 or less, preferably 4.5 or less. The hue parameter is preferably as close to 0 as possible because the hue of the polarizer is more neutralized. The hue parameter is, for example, 1.0 or more. The terms "parallel hue value 'a'" and "parallel hue value 'b'" as used herein refer to a hue value 'a' and a hue value 'b' measured with the parallel laminated polarizer. The terms "hue value 'a'" and "hue value 'b'" refer to single hues defined by the National Bureau of Standards (NBS). The hue value 'a' and the hue value 'b' may be measured with a spectrophotometer (manufactured by JASCO Corporation, product name: "V-7100").

$$\text{Hue parameter} = (a^2+b^2) \quad (2)$$

The thickness of the polarizer is preferably 8 μm or less, more preferably 5 μm or less. When the thickness of the polarizer falls within such range, a polarizer having a more neutralized hue can be obtained. In addition, the thickness of the polarizer is preferably 1.0 μm or more, more preferably 2.0 μm or more.

The polarizer preferably shows absorption dichroism at any wavelength in the wavelength range of from 380 nm to 780 nm. The single layer transmittance of the polarizer is preferably 40.0% or more, more preferably 41.0% or more, still more preferably 42.0% or more, still further more preferably 42.5% or more, particularly preferably 43.0% or more. The single layer transmittance is, for example, 50% or less.

The parallel transmittance (H0) of the polarizer at a wavelength of 420 nm is preferably from 20% to 40%, more preferably from 22% to 38%. When the polarizer has such characteristic, a polarizer having a more neutralized hue is obtained. The parallel transmittance (H0) is as described above. The transmittance is a Y value subjected to visibility correction with the two-degree field of view (C light source) of JIS Z 8701-1982.

The polarization degree of the polarizer is preferably 99.8% or more, more preferably 99.9% or more, still more preferably 99.95% or more. The polarization degree (P) is calculated from the following equation by measuring the single layer transmittance (Ts), parallel transmittance (Tp), and cross transmittance (Tc) of the polarizer. Here, the Ts, the Tp, and the Tc are each a Y value measured with the two-degree field of view (C light source) of JIS Z 8701 and subjected to visibility correction.

$$\text{Polarization degree}(P)(\%) = ((Tp-Tc)/(Tp+Tc)) \times \tfrac{1}{2} \times 100$$

The single hue a defined by the NBS of the polarizer is from −1.2 to 0, preferably from −1.0 to 0. In addition, the single hue b defined by the NBS of the polarizer is from 0 to 3.0, preferably from 0 to 2.5. As the single hue value 'a' and single hue value 'b' of the polarizer are brought closer to 0, a display apparatus in which a display image has a clearer color can be obtained. Therefore, ideal values for the single hue value 'a' and the single hue value 'b' are 0.

The polarizer of the present invention includes a resin film containing a polyvinyl alcohol-based resin (hereinafter referred to as a "PVA-based resin"). Examples of the PVA-based resin include polyvinyl alcohol and an ethylene-vinyl alcohol copolymer. The polyvinyl alcohol is obtained by saponifying polyvinyl acetate. The ethylene-vinyl alcohol copolymer is obtained by saponifying an ethylene-vinyl acetate copolymer.

The saponification degree of the PVA-based resin is typically 85 mol % or more, preferably 95.0 mol % or more, more preferably 99.0 mol % or more. In addition, the saponification degree is 100 mol % or less, preferably 99.95 mol % or less, more preferably 99.93 mol % or less. When the PVA-based resin in the polarizer satisfies such saponification degree, excellent humidification reliability can be achieved. The saponification degree may be determined in conformity with JIS K 6726-1994.

The average polymerization degree of the PVA-based resin may be appropriately selected in accordance with purposes. The average polymerization degree is typically from 1,000 to 10,000, preferably from 1,200 to 6,000, more preferably from 2,000 to 5,000. The average polymerization degree may be determined in conformity with JIS K 6726-1994.

The polarizer typically contains a dichroic substance. Specific examples of the dichroic substance include iodine and an organic dye. Those substances may be used alone or in combination thereof. Iodine is preferably used as the dichroic substance.

B. Method of Producing Polarizer

The polarizer may be produced by any appropriate method. The polarizer is obtained by, for example, subjecting a resin film to various treatments, such as swelling treatment, stretching treatment, dyeing treatment, insolubilizing treatment, cross-linking treatment, washing treatment, and drying treatment. In one embodiment, when subjected to the various treatments, the resin film may be a resin layer formed on a substrate. The laminate of the substrate and the resin layer may be obtained by, for example, a method involving applying an application liquid containing a formation material for the resin film to the substrate, or a method involving laminating the resin film on the substrate.

A method of producing a polarizer of the present invention preferably includes subjecting a laminate of a thermoplastic resin substrate and a polyvinyl alcohol-based resin layer to in-air stretching treatment, dyeing treatment, underwater stretching treatment, and drying shrinkage treatment in the stated order. In the laminate, the PVA-based resin layer preferably contains a halide and a PVA-based resin. In addition, the method of producing a polarizer of the present invention may include any appropriate other step. Examples of the other step include insolubilizing treatment, crosslinking treatment, and washing treatment. Those treatments may each be performed at any appropriate stage of the method of producing a polarizer.

B-1. Production of Laminate

The laminate is obtained by any appropriate method. The laminate is obtained by, for example, forming the PVA-based resin layer containing the halide and the PVA-based resin on one side of the thermoplastic resin substrate. The PVA-based resin layer may be formed by any appropriate method. The layer is preferably formed by applying an application liquid containing the halide and the PVA-based resin to one side of a thermoplastic resin substrate having an elongate shape, and drying the liquid. When the thermoplastic resin substrate having an elongate shape is used, the laminate can be continuously subjected to the treatments while being conveyed. The term "elongate shape" as used herein means a long and thin shape having a length sufficiently longer than its width.

B-1-1. Thermoplastic Resin Substrate

Any appropriate formation material (thermoplastic resin) may be adopted as a formation material for the thermoplastic resin substrate. Examples thereof include: ester-based resins, such as a polyethylene terephthalate-based resin; cycloolefin-based resins, such as a norbornene-based resin; olefin-based resins, such as polypropylene; (meth)acrylic resins; polyamide-based resins; polycarbonate-based resins; and copolymer resins thereof. Of those, a norbornene-based resin and an amorphous polyethylene terephthalate-based resin are preferred.

In one embodiment, an amorphous (not crystallized) polyethylene terephthalate-based resin is preferably used. Of those, a non-crystalline (hardly crystallized) polyethylene terephthalate-based resin is particularly preferably used. Specific examples of the non-crystalline polyethylene terephthalate-based resin include: a copolymer further containing isophthalic acid and/or cyclohexanedicarboxylic acid as a dicarboxylic acid; and a copolymer further containing cyclohexane dimethanol and/or diethylene glycol as a glycol.

In a preferred embodiment, the thermoplastic resin substrate includes a polyethylene terephthalate-based resin having an isophthalic acid unit. This is because such thermoplastic resin substrate is extremely excellent in stretchability and can be suppressed in crystallization at the time of its stretching. This may result from large bending applied to the main chain of the resin by the introduction of the isophthalic acid unit.

The polyethylene terephthalate-based resin has a terephthalic acid unit and an ethylene glycol unit. The content of the isophthalic acid unit is preferably 0.1 mol % or more, more preferably 1.0 mol % or more with respect to the total of all repeating units. This is because a thermoplastic resin substrate extremely excellent in stretchability is obtained. Meanwhile, the content of the isophthalic acid unit is preferably 20 mol % or less, more preferably 10 mol % or less with respect to the total of all the repeating units. When the content is set as described above, the crystallization degree of the substrate can be satisfactorily increased in the drying shrinkage treatment to be described later.

The thickness of the thermoplastic resin substrate is preferably from 20 μm to 300 μm, more preferably from 50 μm to 200 μm. When the thickness is less than 20 μm, it may be difficult to form the PVA-based resin layer. When the thickness is more than 300 μm, in, for example, the underwater stretching treatment to be described later, it may take the thermoplastic resin substrate a long time to absorb water, and an excessively large load may be needed for its stretching. The surface of the thermoplastic resin substrate may be subjected to surface modification treatment (e.g., corona treatment), or an easy-adhesion layer may be formed thereon. Such treatment can provide a laminate excellent in adhesiveness between the thermoplastic resin substrate and the resin layer.

The glass transition temperature (Tg) of the thermoplastic resin substrate is preferably 120° C. or less, more preferably 100° C. or less, still more preferably 90° C. or less. This is because when the laminate is stretched, stretchability can be sufficiently secured while the crystallization of the resin layer (PVA-based resin) is suppressed. As a result, a polarizer having an excellent polarization characteristic can be produced. Meanwhile, the glass transition temperature of the thermoplastic resin substrate is preferably 60° C. or more. When such thermoplastic resin substrate is used, an inconvenience, such as the deformation of the thermoplastic resin substrate (e.g., the occurrence of unevenness, a sag, or a wrinkle), at the time of the application and drying of the application liquid containing the PVA-based resin is prevented, and hence the laminate can be satisfactorily produced. In addition, the stretching of the PVA-based resin layer can be satisfactorily performed at a suitable temperature (e.g., about 60° C.). The glass transition temperature of the thermoplastic resin substrate may be adjusted by, for example, introducing a modifying group into the constituent material for the substrate and/or heating the substrate with a crystallizing material. The glass transition temperature (Tg) is a value determined in conformity with JIS K 7121.

The water absorption ratio of the thermoplastic resin substrate is preferably 0.2% or more, more preferably 0.3% or more. The thermoplastic resin substrate absorbs water, and the water may act like a plasticizer to plasticize the substrate. As a result, the substrate can be largely reduced in stretching stress and hence can be stretched at a high ratio. Meanwhile, the water absorption ratio of the thermoplastic resin substrate is preferably 3.0% or less, more preferably 1.0% or less. When such thermoplastic resin substrate is used, an inconvenience, such as the deterioration of the external appearance of the polarizer to be obtained due to a significant reduction in dimensional stability of the thermoplastic resin substrate at the time of the production of the polarizer, can be prevented. In addition, the rupture of the thermoplastic resin substrate and the peeling of the PVA-based resin layer from the thermoplastic resin substrate can be prevented at the time of the underwater stretching. The water absorption ratio of the thermoplastic resin substrate may be adjusted by, for example, introducing a modifying group into the constituent material for the substrate. The water absorption ratio is a value determined in conformity with JIS K 7209.

The thermoplastic resin substrate may be stretched in advance (before the formation of the PVA-based resin layer to be described later). In one embodiment, the thermoplastic resin substrate is stretched in the lateral direction of the thermoplastic resin substrate having an elongate shape (direction perpendicular to the lengthwise direction thereof).

The lateral direction is preferably a direction perpendicular to the stretching direction of the laminate to be described later. The term "perpendicular" as used herein includes a case in which the directions are substantially perpendicular to each other. Here, the phrase "substantially perpendicular" includes a case in which an angle formed by the directions is 90°±5.0°, and the angle is preferably 90°±3.0°, more preferably 90°±1.0°.

The stretching temperature of the thermoplastic resin substrate is preferably from Tg−10° C. to Tg+50° with respect to the glass transition temperature (Tg). The stretching ratio of the thermoplastic resin substrate is preferably from 1.5 times to 3.0 times.

Any appropriate method may be adopted as a method of stretching the thermoplastic resin substrate. Specifically, the method may be fixed-end stretching or may be free-end stretching. A stretching mode may be dry stretching or may be wet stretching. The stretching of the thermoplastic resin substrate may be performed in one stage, or may be performed in a plurality of stages. When the stretching is performed in a plurality of stages, the stretching ratio is the product of stretching ratios at the respective stages.

B-1-2. Application Liquid

As described above, the application liquid contains the halide and the PVA-based resin. The application liquid is typically a solution obtained by dissolving the halide and the PVA-based resin in a solvent. Those disclosed in the section A may each be used as the PVA-based resin. The content of the PVA-based resin in the application liquid is preferably from 3 parts by weight to 20 parts by weight with respect to 100 parts by weight of the solvent. With such content, a uniform applied film in close contact with the thermoplastic resin substrate can be formed.

Any appropriate halide may be adopted as the halide. Examples thereof include an iodide and sodium chloride. Examples of the iodide include potassium iodide, sodium iodide, and lithium iodide. Of those, potassium iodide is preferred.

The content of the halide in the application liquid is preferably from 5 parts by weight to 20 parts by weight with respect to 100 parts by weight of the PVA-based resin, and is more preferably from 10 parts by weight to 15 parts by weight with respect to 100 parts by weight of the PVA-based resin. When the content of the halide with respect to 100 parts by weight of the PVA-based resin is more than 20 parts by weight, the halide may bleed out to make the polarizer to be finally obtained clouded.

Any appropriate solvent may be used as the solvent of the application liquid. Examples thereof include water, dimethyl sulfoxide, dimethylformamide, dimethylacetamide, N-methylpyrrolidone, polyhydric alcohols, such as various glycols and trimethylolpropane, and amines, such as ethylenediamine and diethylenetriamine. Of those, water is preferred. The solvents may be used alone or in combination thereof.

The application liquid may contain an additive except the PVA-based resin and the halide. Any appropriate additive may be used as the additive. Examples of the additive include a plasticizer and a surfactant. Examples of the plasticizer include polyhydric alcohols, such as ethylene glycol and glycerin. The surfactant is, for example, a nonionic surfactant. Those additives may be used for the purpose of further improving the uniformity, dyeing property, and stretchability of the PVA-based resin layer to be obtained.

B-2. In-Air Stretching Treatment

As described above, the laminate is subjected to the in-air stretching treatment, the dyeing treatment, the underwater stretching treatment, and the drying shrinkage treatment in the stated order. In general, the stretching of the PVA-based resin layer improves the orientation properties of polyvinyl alcohol molecules in the PVA-based resin, but the immersion of the PVA-based resin layer after the stretching in a liquid containing water may disturb the orientation of the polyvinyl alcohol molecules to reduce the orientation properties. In particular, in the case where in-boric-acid-solution stretching is adopted as the underwater stretching, and the laminate is stretched at a relatively high temperature in the boric acid solution in order that the stretching of the thermoplastic resin substrate may be stabilized, a tendency for the reductions in orientation properties is remarkable. For example, while the stretching of a PVA film alone in a boric acid solution is generally performed at 60° C., the stretching of the laminate of the A-PET (thermoplastic resin substrate) and the PVA-based resin layer is performed at a temperature as high as around 70° C. In this case, the orientation properties of the PVA molecules at the initial stage of the stretching may reduce at a stage before the orientation properties are improved by the underwater stretching. In contrast, when the laminate of the PVA-based resin layer containing the halide and the thermoplastic resin substrate is stretched in air at high temperature (auxiliary stretching) before being stretched in the boric acid solution, the crystallization of the PVA-based resin in the PVA-based resin layer of the laminate after the auxiliary stretching may be accelerated. As a result, the disturbance of the orientation of the polyvinyl alcohol molecules and reductions in orientation properties thereof in the case where the PVA-based resin layer is immersed in a liquid can be suppressed as compared to those in the case where the PVA-based resin layer is free of the halide. Thus, the optical characteristics of the polarizer to be obtained through treatment steps performed by immersing the laminate in a liquid, such as the dyeing treatment and the underwater stretching treatment, can be improved.

In particular, in order that high optical characteristics may be obtained, a two-stage stretching method in which the in-air stretching (auxiliary stretching) and the in-boric-acid-solution stretching are combined is selected. When the auxiliary stretching is introduced like the two-stage stretching, the laminate can be stretched while the crystallization of the thermoplastic resin substrate is suppressed. Accordingly, a problem in that the stretchability of the laminate is reduced by excessive crystallization of the thermoplastic resin substrate in the subsequent in-boric-acid-solution stretching is solved, and hence the laminate can be stretched at a higher ratio. Further, in the case where the PVA-based resin is applied onto the thermoplastic resin substrate, in order that an influence of the glass transition temperature of the thermoplastic resin substrate may be suppressed, an application temperature needs to be reduced as compared to that in the case where the PVA-based resin is applied onto a typical metal drum. As a result, there may occur a problem in that the crystallization degree of the PVA-based resin becomes relatively low and hence sufficient optical characteristics are not obtained. In contrast, when the auxiliary stretching is introduced, even in the case where the PVA-based resin is applied onto the thermoplastic resin substrate, the crystallinity of the PVA-based resin can be improved, and hence high optical characteristics can be achieved. In addition, at the same time, when the orientation property of the PVA-based resin is improved in advance, problems, such as a reduction in orientation property of the PVA-based resin and the dissolution thereof, at the time of the immersion of the laminate in water in a subsequent dyeing step or underwater stretching step can be prevented, and hence high optical characteristics can be achieved.

A stretching method for the in-air stretching (hereinafter sometimes referred to as "in-air auxiliary stretching") may be fixed-end stretching (e.g., a method involving stretching the laminate with a tenter stretching machine), or may be free-end stretching (e.g., a method involving passing the laminate between rolls having different peripheral speeds to uniaxially stretch the laminate). The free-end stretching may be actively adopted in order that high optical characteristics may be obtained. In one embodiment, the in-air stretching treatment includes a heated roll stretching step of stretching the laminate with a difference in peripheral speed between heated rolls while conveying the laminate in its lengthwise direction. The in-air stretching treatment typically includes a zone stretching step and the heated roll stretching step. The order of the zone stretching step and the heated roll stretching step is not limited, and the zone stretching step may be performed in advance, or the heated roll stretching step may be performed in advance. The zone stretching step may be omitted. In one embodiment, the zone stretching step and the heated roll stretching step are performed in the stated order. In addition, in another embodiment, the laminate (film) is stretched by gripping a film end portion in a tenter stretching machine and extending a distance between tenters in a flow direction (the extension of the distance between the tenters corresponds to a stretching ratio). At this time, the distance between the tenters in the widthwise direction of the laminate (direction vertical to the flow direction) is set so that the tenters may be appropriately close to each other. The distance may be preferably set so that the stretching ratio of the laminate in the flow direction may be closer to that in the free-end stretching. In the case of the free-end stretching, the shrinkage ratio of the laminate in the widthwise direction is calculated from the equation "shrinkage ratio in widthwise direction=$(1/\text{stretching ratio})^{1/2}$."

The in-air auxiliary stretching may be performed in one stage, or may be performed in a plurality of stages. When the in-air auxiliary stretching is performed in a plurality of stages, the stretching ratio is the product of stretching ratios at the respective stages. It is preferred that the stretching direction of the laminate in the in-air auxiliary stretching be substantially identical to the stretching direction thereof in the underwater stretching.

The stretching ratio in the in-air auxiliary stretching is preferably from 2.0 times to 3.5 times. The maximum stretching ratio when the in-air auxiliary stretching and the underwater stretching are combined is preferably 5.0 times or more, more preferably 5.5 times or more, still more preferably 6.0 times or more with respect to the original length of the laminate. The term "maximum stretching ratio" as used herein refers to a stretching ratio immediately before the rupture of the laminate, and refers to a value lower than a value, which is obtained by separately identifying the stretching ratio at which the laminate ruptures, by 0.2.

The stretching temperature of the in-air auxiliary stretching may be set to any appropriate value in accordance with, for example, the formation material for the thermoplastic resin substrate and its stretching mode. The stretching temperature is preferably equal to or more than the glass transition temperature (Tg) of the thermoplastic resin substrate, more preferably equal to or more than the glass transition temperature (Tg) of the thermoplastic resin substrate+10° C., still more preferably equal to or more than Tg+15° C. Meanwhile, the stretching temperature is preferably equal to or less than 170° C. When the stretching is performed at such temperature, rapid advance of the crystallization of the PVA-based resin is suppressed, and hence an inconvenience due to the crystallization (e.g., the inhibition of the orientation of the PVA-based resin layer by the stretching) can be suppressed.

B-3. Insolubilizing Treatment

The laminate is subjected to insolubilizing treatment after the in-air auxiliary stretching treatment and before the dyeing treatment and the underwater stretching treatment as required. The insolubilizing treatment is typically performed by immersing the PVA-based resin layer (laminate) in an aqueous solution of boric acid. When the insolubilizing treatment is performed, water resistance is imparted to the PVA-based resin layer, and hence reductions in orientation properties of the PVA molecules at the time of their immersion in water can be prevented. The concentration of the aqueous solution of boric acid is preferably from 1 part by weight to 4 parts by weight with respect to 100 parts by weight of water. The liquid temperature of the insolubilizing bath (aqueous solution of boric acid) is preferably from 20° C. to 50° C.

B-4. Dyeing Treatment

The dyeing treatment is preferably performed by causing the PVA-based resin layer to adsorb a dichroic substance. A method for the adsorption is, for example, a method involving immersing the PVA-based resin layer (laminate) in a dyeing liquid containing the dichroic substance, a method involving applying the dyeing liquid to the PVA-based resin layer, or a method involving spraying the PVA-based resin layer with the dyeing liquid. Of those, a method involving immersing the PVA-based resin layer (laminate) in the dyeing liquid is preferred. This is because the dichroic substance can satisfactorily adsorb to the PVA-based resin layer.

When iodine is used as the dichroic substance, an aqueous solution of iodine is preferably used as the dyeing liquid. The compounding amount of iodine is preferably from 0.05 part by weight to 5.0 parts by weight with respect to 100 parts by weight of water. The aqueous solution of iodine is preferably compounded with an iodide for improving the solubility of iodine in water. Examples of the iodide include potassium iodide, lithium iodide, sodium iodide, zinc iodide, aluminum iodide, lead iodide, copper iodide, barium iodide, calcium iodide, tin iodide, and titanium iodide. Of those, potassium iodide is preferably used as the iodide. The compounding amount of the iodide is preferably from 0.1 part by weight to 10 parts by weight, more preferably from 0.3 part by weight to 5 parts by weight with respect to 100 parts by weight of water. When an aqueous solution of iodine containing potassium iodide is used as the dyeing liquid, a content ratio between iodine and potassium iodide in the aqueous solution of iodine is preferably from 1:5 to 1:20, more preferably from 1:5 to 1:10.

The liquid temperature of the dyeing liquid at the time of the dyeing is preferably from 20° C. to 50° C. When the dyeing is performed by immersing the laminate in the dyeing liquid, an immersion time is preferably from 5 seconds to 5 minutes, more preferably from 30 seconds to 90 seconds. The dyeing conditions (the concentration and liquid temperature of the dyeing liquid, and the immersion time) may be set so that the polarization degree or single layer transmittance of the polarizer to be finally obtained may fall within a desired range.

B-5. Cross-Linking Treatment

The PVA-based resin layer is subjected to cross-linking treatment after the dyeing treatment and before the underwater stretching treatment as required. The cross-linking treatment is typically performed by immersing the PVA-based resin layer in an aqueous solution of boric acid. When the cross-linking treatment is performed, water resistance is imparted to the PVA-based resin layer, and hence reductions in orientation properties of the PVA molecules at the time of their immersion in high-temperature water in the subsequent underwater stretching can be prevented. The concentration of the aqueous solution of boric acid is preferably from 1 part by weight to 5 parts by weight with respect to 100 parts by weight of water. In addition, when the cross-linking treatment is performed after the dyeing treatment, the aqueous solution of boric acid preferably contains an iodide. The compounding of the aqueous solution with the iodide can suppress the elution of iodine that the PVA-based resin layer has been caused to adsorb. The compounding amount of the iodide is preferably from 1 part by weight to 5 parts by weight with respect to 100 parts by weight of water. Specific examples of the iodide are as described above. The liquid temperature of the cross-linking bath (aqueous solution of boric acid) is preferably from 20° C. to 50° C.

B-6. Underwater Stretching Treatment

The underwater stretching treatment is performed by immersing the laminate in a stretching bath. According to the underwater stretching treatment, the laminate can be stretched at a temperature lower than the glass transition temperature of the thermoplastic resin substrate and/or the PVA-based resin layer (typically about 80° C.), and hence the PVA-based resin layer can be stretched at a high ratio while its crystallization is suppressed. As a result, a polarizer having excellent optical characteristics can be produced.

Any appropriate method may be adopted as a method of stretching the laminate. Specifically, the method may be fixed-end stretching or may be free-end stretching (e.g., a method involving passing the laminate between rolls having different peripheral speeds to uniaxially stretch the laminate). Of those, free-end stretching is preferably adopted. The stretching of the laminate may be performed in one stage, or may be performed in a plurality of stages. When the stretching is performed in a plurality of stages, the stretching ratio (maximum stretching ratio) of the laminate to be described later is the product of stretching ratios at the respective stages.

The underwater stretching is preferably performed by immersing the laminate in an aqueous solution of boric acid (in-boric-acid-solution stretching). The use of the aqueous solution of boric acid as the stretching bath can impart, to the PVA-based resin layer, rigidity with which the layer can withstand tension to be applied at the time of the stretching and water resistance preventing the layer from dissolving in water. Specifically, boric acid can produce a tetrahydroxyboric acid anion in the aqueous solution to cross-link with the PVA-based resin through a hydrogen bond. As a result, the rigidity and the water resistance are imparted to the PVA-based resin layer, and hence the layer can be satisfactorily stretched. Thus, a polarizer having excellent optical characteristics can be produced.

The aqueous solution of boric acid is preferably obtained by dissolving boric acid and/or a borate in water serving as a solvent. The boric acid concentration of the aqueous solution of boric acid is preferably from 1 part by weight to 10 parts by weight, more preferably from 2.5 parts by weight to 6 parts by weight, still more preferably from 3 parts by weight to 5 parts by weight with respect to 100 parts by weight of water. When the boric acid concentration is set to 1 part by weight or more, the dissolution of the PVA-based resin layer can be effectively suppressed, and hence a polarizer having higher characteristics can be produced. An aqueous solution obtained by dissolving, for example, a boron compound, such as borax, glyoxal, or glutaraldehyde in the solvent in addition to boric acid or the borate may also be used.

The stretching bath (aqueous solution of boric acid) is preferably further compounded with an iodide. The compounding of the bath with the iodide can suppress the elution of iodine that the PVA-based resin layer has been caused to adsorb. Specific examples of the iodide are as described above. The concentration of the iodide is preferably from 0.05 part by weight to 15 parts by weight, more preferably from 0.5 part by weight to 8 parts by weight with respect to 100 parts by weight of water.

A stretching temperature (the liquid temperature of the stretching bath) is preferably from 40° C. to 85° C., more preferably from 60° C. to 75° C. With such temperature, the PVA-based resin layer can be stretched at a high ratio while its dissolution is suppressed. Specifically, as described above, the glass transition temperature (Tg) of the thermoplastic resin substrate is preferably 60° C. or more in relation to the formation of the PVA-based resin layer. In this case, when the stretching temperature is less than 40° C., there is a risk in that the layer cannot be satisfactorily stretched even in consideration of the plasticization of the thermoplastic resin substrate by water. Meanwhile, as the temperature of the stretching bath increases, the solubility of the PVA-based resin layer may become higher to make it impossible to obtain excellent optical characteristics. The time period for which the laminate is immersed in the stretching bath is preferably from 15 seconds to 5 minutes.

A stretching ratio by the underwater stretching is preferably 1.5 times or more, more preferably 3.0 times or more. The total stretching ratio of the laminate is preferably 5.0 times or more, more preferably 5.5 times or more with respect to the original length of the laminate. When such high stretching ratio is achieved, a polarizer extremely excellent in optical characteristics can be produced. Such high stretching ratio can be achieved by adopting an underwater stretching mode (in-boric-acid-solution stretching).

B-7. Washing Treatment

The PVA-based resin layer (resin film) is preferably subjected to washing treatment after the underwater stretching treatment and before the drying shrinkage treatment. The washing treatment is typically performed by immersing the resin film in an aqueous solution of potassium iodide.

B-8. Drying Shrinkage Treatment

The drying shrinkage treatment may be performed by zone heating to be performed by heating the entirety of a zone, or may be performed by heating conveying rolls (using so-called heated rolls) (heated roll drying mode). Both of the zone heating and the heated roll drying mode are preferably used. When the laminate is dried with the heated rolls, the heating curl of the laminate is efficiently suppressed, and hence a polarizer excellent in external appearance can be produced. Specifically, when the laminate is dried in a state of being arranged along the heated rolls, the crystallization of the thermoplastic resin substrate is efficiently accelerated, and hence its crystallization degree can be increased. Accordingly, the crystallization degree of the thermoplastic resin substrate can be satisfactorily increased even at a relatively low drying temperature. As a result, the thermoplastic resin substrate is increased in rigidity to be in a state of being capable of resisting the shrinkage of the PVA-based resin layer by the drying, and hence the curl is suppressed. In addition, when the heated rolls are used, the laminate can be dried while being maintained in a flat state, and hence the occurrence of not only the curl but also a wrinkle can be suppressed.

The drying shrinkage treatment is preferably performed by heating the laminate while conveying the laminate in its lengthwise direction. At this time, the laminate can be shrunk in its widthwise direction by the drying shrinkage treatment. As a result, the optical characteristics of the polarizer to be obtained can be improved. This is because the orientation properties of the PVA and a PVA-iodine complex can be effectively improved by the shrinkage. The shrinkage ratio of the laminate in the widthwise direction by the drying shrinkage treatment is preferably 1% or more, more preferably 2% or more, still more preferably 4% or more. In addition, the shrinkage ratio of the laminate in the widthwise direction is preferably 10% or less, more preferably 8% or less, still more preferably 6% or less.

FIG. 1 is a schematic view for illustrating an example of the drying shrinkage treatment. In the drying shrinkage treatment, a laminate 200 is dried while being conveyed with conveying rolls R1 to R6 each of which has been heated to a predetermined temperature and guide rolls G1 to G4. In the illustrated example, the conveying rolls R1 to R6 are arranged so that the PVA-based resin layer surface and thermoplastic resin substrate surface of the laminate may be alternately heated in a continuous manner. However, for example, the conveying rolls R1 to R6 may be arranged so that only one surface of the laminate 200 (e.g., the thermoplastic resin substrate surface) may be continuously heated.

Drying conditions may be controlled by adjusting, for example, the heating temperature of each of the conveying rolls (temperature of each of the heated rolls), the number of the heated rolls, and the time period for which the laminate is brought into contact with the heated rolls. The temperature of each of the heated rolls is preferably from 60° C. to 120° C., more preferably from 65° C. to 100° C., still more preferably from 70° C. to 80° C. In this case, the crystallization degree of the thermoplastic resin substrate is satisfactorily increased, and hence the curl of the laminate can be satisfactorily suppressed. In addition, an optical laminate extremely excellent in durability can be produced. The temperature of each of the heated rolls may be measured with a contact-type temperature gauge. Although the 6 conveying rolls are arranged in the illustrated example, the number of the conveying rolls is not particularly limited as long as the number is 2 or more. The number of the conveying rolls to be arranged is typically from 2 to 40, preferably from 4 to 30. The time period for which the laminate is brought into contact with the heated rolls (total contact time) is preferably from 1 second to 300 seconds, more preferably from 1 second to 20 seconds, still more preferably from 1 second to 10 seconds.

The heated rolls may be arranged in a heating furnace (e.g., an oven), or may be arranged in a typical production line (under a room temperature environment). The heated rolls are preferably arranged in a heating furnace including an air blower. When the drying with the heated rolls and drying with hot air are used in combination, a sharp temperature change between the heated rolls can be suppressed, and hence the shrinkage of the laminate in its widthwise direction can be easily controlled. The temperature of the hot-air drying is preferably from 30° C. to 100° C. In addition, a hot-air drying time is preferably from 1 second to 300 seconds. The air speed of the hot air is preferably from about 10 m/sec to about 30 m/sec. The air speed is an air speed in the heating furnace, and may be measured with a mini-vane-type digital anemometer.

C. Overall Configuration of Optical Laminate

An optical laminate of the present invention includes the above-mentioned polarizer and a light-diffusing layer. The optical laminate may include any appropriate other layer in accordance with, for example, applications. Examples of the other layer include a retardation layer and a surface-treated layer (e.g., an antireflection layer, an antiglare layer, or a hard coat layer).

Figure 2:
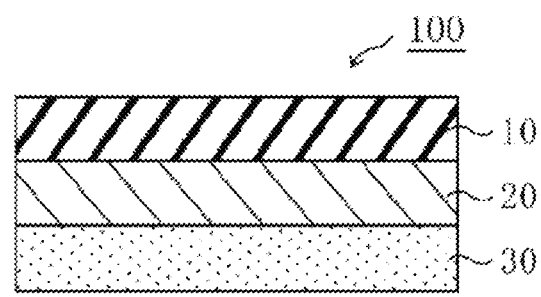
FIG. 2 is a schematic sectional view of an optical laminate according to one embodiment of the present invention.

In one embodiment, the optical laminate of the present invention includes: the above-mentioned polarizer; a retardation layer configured to substantially function as a λ/4 plate; and the light-diffusing layer. FIG. 2 is a schematic sectional view of the optical laminate according to one embodiment of the present invention. An optical laminate 100 illustrated in FIG. 2 includes: a polarizer 10; a retardation layer 20 configured to substantially function as a λ/4 plate; and a light-diffusing layer 30. As described above, the polarizer 10 has a transmittance parameter of 0.8 or more and a hue parameter of 5 or less. When the optical laminate includes such polarizer, an optical laminate that can provide a liquid crystal display apparatus having excellent display characteristics (e.g., a clear color, an excellent reflection hue, and an excellent viewing angle characteristic) is obtained.

The optical laminate 100, which includes the only one light-diffusing layer 30 in the illustrated example, may include two or more light-diffusing layers. For example, the laminate may further include a light-diffusing layer between the polarizer 10 and the retardation layer 20. In addition, the retardation layer 20 may be a single layer, or may have a laminated structure. The respective layers may be laminated through intermediation of an adhesion layer (an adhesive layer or a pressure-sensitive adhesive layer), though the adhesion layer is not shown. In one embodiment, the light-diffusing layer 30 is a light-diffusing pressure-sensitive adhesive layer. In this embodiment, the light-diffusing layer also functions as an adhesion layer. In addition, the optical laminate 100 may further include any appropriate other layer. Examples of the other layer include those described above.

The thickness of the optical laminate may be set to any appropriate value. The thickness is typically from about 40 μm to about 300 μm.

C-1. Light-Diffusing Layer

The light-diffusing layer 30 may include a light-diffusing element, or may include a light-diffusing pressure-sensitive adhesive or a light-diffusing adhesive. The light-diffusing element contains a matrix and light-diffusible fine particles dispersed in the matrix. The light-diffusing element may be a light-diffusing cured layer (e.g., a layer formed by applying a dispersion liquid (application liquid for forming a light-diffusing layer) containing a resin for a matrix and the light-diffusible fine particles, and as required, an additive onto any appropriate substrate, and curing and/or drying the liquid), or may be a light-diffusing film (e.g., a commercial film). The matrix of the light-diffusing pressure-sensitive adhesive includes a pressure-sensitive adhesive, and the matrix of the light-diffusing adhesive includes an adhesive.

The light-diffusing performance of the light-diffusing layer may be represented by, for example, a haze value. For example, when the optical laminate is used for a reflection-type liquid crystal display apparatus, the haze value of the light-diffusing layer is preferably 80% or more, more preferably from 80% to 98%, still more preferably from 85% to 98%. When the optical laminate is used for a transmission-type liquid crystal display apparatus, the haze value of the light-diffusing layer is preferably 20% or more, more preferably from 20% to 80%, still more preferably from 20% to 60%. When the haze value is set within the range, a liquid crystal display apparatus excellent in viewing angle characteristic can be provided. The haze value of the light-diffusing layer may be controlled by adjusting, for example, a constituent material for the matrix (pressure-sensitive adhesive) of the layer, and a constituent material for, and the volume-average particle diameter and compounding amount, of the light-diffusible fine particles thereof.

The total light transmittance of the light-diffusing layer is preferably 75% or more, more preferably 80% or more, still more preferably 85% or more.

The thickness of the light-diffusing layer may be appropriately adjusted in accordance with, for example, its configuration and desired light-diffusing performance. Specifically, the thickness of the light-diffusing layer is preferably from 5 μm to 100 μm, more preferably from 10 μm to 30 μm.

In one embodiment, the light-diffusing layer 30 includes a light-diffusing pressure-sensitive adhesive. The light-diffusing pressure-sensitive adhesive typically contains a pressure-sensitive adhesive serving as a matrix and light-diffusible fine particles dispersed in the pressure-sensitive adhesive. A case in which the light-diffusing layer includes the light-diffusing pressure-sensitive adhesive can contribute to the thinning of a liquid crystal display apparatus because an adhesion layer (a pressure-sensitive adhesive layer or an adhesive layer) at the time of the bonding of any other constituent member, such as the retardation layer, can be omitted.

Any appropriate pressure-sensitive adhesive may be used as the pressure-sensitive adhesive (matrix). Specific examples of the pressure-sensitive adhesive include a rubber-based pressure-sensitive adhesive, an acrylic pressure-sensitive adhesive, a silicone-based pressure-sensitive adhesive, an epoxy-based pressure-sensitive adhesive, and a cellulose-based pressure-sensitive adhesive. Of those, an acrylic pressure-sensitive adhesive is preferred. The use of the acrylic pressure-sensitive adhesive can provide a light-diffusing layer excellent in heat resistance and transparency. The pressure-sensitive adhesives may be used alone or in combination thereof.

Any appropriate acrylic pressure-sensitive adhesive may be used as the acrylic pressure-sensitive adhesive. The glass transition temperature of the acrylic pressure-sensitive adhesive is preferably from −60° C. to −10° C., more preferably from −55° C. to −15° C. The weight-average molecular weight of the acrylic pressure-sensitive adhesive is preferably from 200,000 to 3,000,000, more preferably from 250,000 to 2,800,000. The use of the acrylic pressure-sensitive adhesive having such characteristics can provide an appropriate pressure-sensitive adhesive property.

The refractive index of the acrylic pressure-sensitive adhesive is preferably from 1.40 to 1.65, more preferably from 1.45 to 1.60.

The acrylic pressure-sensitive adhesive is typically obtained by polymerizing a main monomer imparting a pressure-sensitive adhesive property, a comonomer imparting cohesiveness, and a functional group-containing monomer serving as a cross-linking point while imparting a pressure-sensitive adhesive property. The acrylic pressure-sensitive adhesive having the above-mentioned characteristics may be synthesized by any appropriate method, and may be synthesized with reference to, for example, "Chemistry and Application of Adhesion/Pressure-sensitive Adhesion" by Katsuhiko Nakamae published by Dainippon Tosho Publishing Co., Ltd. In addition, a pressure-sensitive adhesive to be applied to a light-diffusing pressure-sensitive adhesive layer, which is disclosed in Japanese Patent Application Laid-open No. 2014-224964, may be used. The description of the literature is incorporated herein by reference.

The content of the pressure-sensitive adhesive in the light-diffusing layer is preferably from 50 wt % to 99.7 wt %, more preferably from 52 wt % to 97 wt %.

Any appropriate fine particles may be used as the light-diffusible fine particles as long as the effects of the present invention are obtained. Specific examples thereof include inorganic fine particles and polymer fine particles. The light-diffusible fine particles are preferably the polymer fine particles. A material for the polymer fine particles is, for example, a silicone resin, a methacrylic resin (e.g., polymethyl methacrylate), a polystyrene resin, a polyurethane resin, or a melamine resin. Those resins can each provide a light-diffusing pressure-sensitive adhesive layer excellent in diffusing performance because the resins each have excellent dispersibility in the pressure-sensitive adhesive and an appropriate refractive index difference from the pressure-sensitive adhesive. Of those, at least one kind selected from the group consisting of a silicone resin, a polystyrene resin, and an acrylic resin is preferred. The shape of each of the light-diffusible fine particles may be, for example, a perfect spherical shape, a flat shape, or an indefinite shape. The light-diffusible fine particles may be used alone or in combination thereof.

In one embodiment, the refractive index of each of the light-diffusible fine particles is lower than the refractive index of the pressure-sensitive adhesive. The refractive index of each of the light-diffusible fine particles is preferably from 1.30 to 1.70, more preferably from 1.40 to 1.65. When the refractive index of each of the light-diffusible fine particles falls within such range, a refractive index difference from the pressure-sensitive adhesive can be set within a desired range. As a result, a light-diffusing layer having a desired haze value can be obtained.

The absolute value of the refractive index difference between each of the light-diffusible fine particles and the pressure-sensitive adhesive is preferably more than 0 and 0.2 or less, more preferably more than 0 and 0.15 or less, still more preferably from 0.01 to 0.13.

The volume-average particle diameter of the light-diffusible fine particles is preferably from 1 μm to 5 μm, more preferably from 2 μm to 5 μm, still more preferably from 3 μm to 5 μm. When the volume-average particle diameter of the light-diffusible fine particles falls within such range, a light-diffusing pressure-sensitive adhesive layer having a desired haze value and having a neutral hue can be obtained. When the optical laminate is used for a reflection-type liquid crystal display apparatus, it is preferable that the volume-average particle diameter of the light-diffusible fine particles falls within such range. When the optical laminate is used for a transmission-type liquid crystal display apparatus, the volume-average particle diameter of the light-diffusible fine particles is preferably from 2.5 μm to 5 μm. The volume-average particle diameter may be measured with, for example, an ultracentrifugal automatic particle size distribution-measuring apparatus.

The content of the light-diffusible fine particles in the light-diffusing pressure-sensitive adhesive is preferably from 0.3 wt % to 50 wt %, more preferably from 3 wt % to 48 wt %. When the content of the light-diffusible fine particles is set within the range, a light-diffusing pressure-sensitive adhesive layer having excellent light-diffusing performance can be obtained.

The light-diffusing layer may contain any appropriate additive. Examples of the additive include an antistatic agent and an antioxidant.

In another embodiment, the light-diffusing layer includes a light-diffusing element. In this case, the light-diffusing layer typically contains a matrix and light-diffusible fine particles dispersed in the matrix. The matrix includes, for example, a resin curable with ionizing radiation. Examples of the ionizing radiation include UV light, visible light, an infrared ray, and an electron beam. Of those, UV light is preferred. Therefore, the matrix preferably includes a UV-curable resin. Examples of the UV-curable resin include an acrylic resin, an aliphatic (e.g., polyolefin) resin, and a urethane-based resin. With regard to the light-diffusible fine particles, the same fine particles as the light-diffusible fine particles that may be used in the light-diffusing pressure-sensitive adhesive may be used.

The light-diffusing layer may be formed by, for example, applying a dispersion liquid (application liquid for forming a light-diffusing layer) containing a pressure-sensitive adhesive (or an adhesive or a resin for a matrix) and the light-diffusible fine particles, and as required, an additive onto any appropriate substrate, and curing and/or drying the liquid. The substrate may be, for example, a separator, or may be the polarizer or the retardation film. As described above, the light-diffusing layer may be formed by application. Accordingly, when a retardation film having an elongate shape and a polarizer having an elongate shape are used, an optical laminate can be produced by a roll-to-roll process, and as a result, the production efficiency of a liquid crystal display apparatus can be improved.

C-2. Retardation Layer

The retardation layer is a retardation layer configured to substantially function as a λ/4 plate. The retardation layer 20 only needs to be a layer configured to substantially function as a λ/4 plate. For example, the layer may be a single layer (so-called λ/4 plate), or may be a layer having a laminated structure, the layer being configured to exhibit an optical compensation function as a λ/4 plate through the combination of a plurality of retardation plates.

The Nz coefficient of the retardation layer is preferably from 1 to 3, more preferably from 1 to 2.5, still more preferably from 1 to 2. When such relationship is satisfied, a more excellent reflection hue can be achieved.

The thickness of the retardation layer may be set so that a desired in-plane retardation may be obtained. The thickness of the retardation layer is preferably from 10 µm to 80 µm, more preferably from 20 µm to 60 µm.

In one embodiment, the retardation layer preferably shows a refractive index characteristic of nx>ny≥nz. The in-plane retardation Re(550) of the retardation layer is preferably from 80 nm to 200 nm, more preferably from 100 nm to 180 nm, still more preferably from 110 nm to 170 nm.

The retardation layer preferably has so-called reverse wavelength dispersion dependency in which its in-plane retardations satisfy a relationship of Re(450)<Re(550). When such relationship is satisfied, an excellent reflection hue can be achieved. A ratio "Re(450)/Re(550)" is preferably 0.8 or more and less than 1, more preferably 0.8 or more and 0.95 or less.

The retardation layer has a slow axis. An angle formed by the slow axis of the retardation layer and the absorption axis of the polarizer is preferably from 38° to 52°, more preferably from 42° to 48°, still more preferably about 45°. With such angle, an extremely excellent antireflection characteristic can be achieved.

The retardation layer is typically a retardation film formed of any appropriate resin. A polycarbonate-based resin is preferably used as the resin forming the retardation film. Details about the polycarbonate-based resin and specific examples thereof are described in, for example, Japanese Patent Application Laid-open No. 2014-026266. The description of the laid-open publication is incorporated herein by reference.

The retardation layer is obtained by, for example, stretching a film formed from the polycarbonate-based resin. Any appropriate forming method may be adopted as a method of forming a film from the polycarbonate-based resin. Specific examples thereof include a compression molding method, a transfer molding method, an injection molding method, an extrusion molding method, a blow molding method, a powder forming method, a FRP molding method, a cast coating method (such as a casting method), a calendar molding method, and a hot-press method. Of those, an extrusion molding method or a cast coating method is preferred. This is because the extrusion molding method or the cast coating method can increase the smoothness of the film to be obtained and provide satisfactory optical uniformity. Forming conditions may be appropriately set depending on, for example, the composition and kind of the resin to be used, and the desired characteristics of the retardation layer. For the polycarbonate-based resin, many film products are commercially available, and hence the commercially available films may each be subjected to stretching treatment as it is.

The thickness of the resin film (unstretched film) may be set to any appropriate value depending on, for example, the desired thickness and desired optical characteristics of the retardation layer, and stretching conditions to be described later. The thickness is preferably from 50 µm to 300 µm.

Any appropriate stretching method and stretching conditions (such as a stretching temperature, a stretching ratio, and a stretching direction) may be adopted for the stretching. Specifically, one kind of various stretching methods, such as free-end stretching, fixed-end stretching, free-end shrinkage, and fixed-end shrinkage, may be employed alone, or two or more kinds thereof may be employed simultaneously or sequentially. With regard to the stretching direction, the stretching may be performed in various directions or dimensions, such as a lengthwise direction, a widthwise direction, a thickness direction, and an oblique direction. When the glass transition temperature of the resin film is represented by Tg, the stretching temperature falls within a range of preferably from Tg−30° C. to Tg+60° C., more preferably from Tg−10° C. to Tg+50° C.

A retardation film having the desired optical characteristics (such as a refractive index characteristic, an in-plane retardation, and an Nz coefficient) can be obtained by appropriately selecting the stretching method and stretching conditions.

In one embodiment, the retardation film is produced by subjecting a resin film to uniaxial stretching or fixed-end uniaxial stretching. The fixed-end uniaxial stretching is specifically, for example, a method involving stretching the resin film in its widthwise direction (lateral direction) while running the film in its lengthwise direction. The stretching ratio is preferably from 1.1 times to 3.5 times.

In another embodiment, the retardation film may be produced by continuously subjecting a resin film having an elongate shape to oblique stretching in the direction of a predetermined angle θ with respect to a lengthwise direction. When the oblique stretching is adopted, a stretched film having an elongate shape and having an alignment angle that is the angle θ with respect to the lengthwise direction of the film (having a slow axis in the direction of the angle θ) is obtained, and for example, roll-to-roll process can be performed in its lamination with the polarizer. As a result, the manufacturing process can be simplified. The angle θ may be an angle formed by the absorption axis of the polarizer and the slow axis of the retardation layer.

As a stretching machine to be used for the oblique stretching, for example, there is given a tenter stretching machine capable of applying feeding forces, or tensile forces or take-up forces, having different speeds on left and right sides in a lateral direction and/or a longitudinal direction. Examples of the tenter stretching machine include a lateral uniaxial stretching machine and a simultaneous biaxial stretching machine, and any appropriate stretching machine may be used as long as the resin film having an elongate shape can be continuously subjected to the oblique stretching.

Through appropriate control of each of the speeds on the left and right sides in the stretching machine, a retardation layer (substantially a retardation film having an elongate shape) having the desired in-plane retardation and having a slow axis in the desired direction can be obtained.

The stretching temperature of the film may be changed depending on, for example, the desired in-plane retardation value and thickness of the retardation layer, the kind of the resin to be used, the thickness of the film to be used, and a stretching ratio. Specifically, the stretching temperature is preferably from Tg−30° C. to Tg+30° C., more preferably from Tg−15° C. to Tg+15° C., most preferably from Tg−10° C. to Tg+10° C. When the film is stretched at such temperature, a retardation layer having appropriate characteristics can be obtained. Tg refers to the glass transition temperature of a constituent material for the film.

In another embodiment, the retardation layer shows a flat wavelength dispersion characteristic. In this case, the ratio "Re(450)/Re(550)" of the retardation layer is preferably from 0.99 to 1.03, and the ratio "Re (650)/Re(550)" thereof is preferably from 0.98 to 1.02. In this case, the retardation layer may have a laminated structure. Specifically, a characteristic close to an ideal reverse wavelength dispersion characteristic can be obtained by arranging a retardation film configured to function as a λ/2 plate and a retardation film configured to function as a λ/4 plate at a predetermined axis angle (e.g., from 50° to 70°, preferably about 60°). As a result, an extremely excellent antireflection characteristic can be achieved.

In this embodiment, the angle formed by the slow axis of the retardation layer and the absorption axis of the polarizer may be set to any appropriate angle. For example, the film configured to function as a λ/2 plate and the film configured to function as a λ/4 plate may be arranged so that an angle formed by the slow axis of the film configured to function as a λ/2 plate and the absorption axis of the polarizer may be from 5° to 30°, preferably about 15°, and an angle formed by the slow axis of the film configured to function as a λ/4 plate and the absorption axis of the polarizer may be from 60° to 90°, preferably about 75°. With such angles, an extremely excellent antireflection characteristic can be achieved.

In this embodiment, the retardation layer may include any appropriate resin film that can satisfy the characteristics described above. Typical examples of such resin include a cyclic olefin-based resin, a polycarbonate-based resin, a cellulose-based resin, a polyester-based resin, a polyvinyl alcohol-based resin, a polyamide-based resin, a polyimide-based resin, a polyether-based resin, a polystyrene-based resin, and an acrylic resin. Of those, a cyclic olefin-based resin or a polycarbonate-based resin may be suitably used.

The cyclic olefin-based resin is a generic term for resins each polymerized by using a cyclic olefin as a polymerization unit, and examples thereof include resins described in JP 01-240517 A, JP 03-14882 A, and JP 03-122137 A. Specific examples thereof include: a ring-opened (co)polymer of the cyclic olefin, an addition polymer of the cyclic olefin, a copolymer (typically a random copolymer) of the cyclic olefin and an α-olefin, such as ethylene or propylene, and graft-modified products obtained by modifying the polymers with unsaturated carboxylic acids or derivatives thereof; and hydrogenated products thereof. Specific examples of the cyclic olefin include norbornene-based monomers.

In the present invention, any other cycloolefin that may be subjected to ring-opening polymerization may be used in combination with the cycloolefin to the extent that the object of the present invention is not impaired. Specific examples of such cycloolefin include compounds each having one reactive double bond, such as cyclopentene, cyclooctene, and 5,6-dihydrodicyclopentadiene.

A commercially available film may be used as a film formed from the cyclic olefin-based resin. Specific examples thereof include: products available under the product names "ZEONEX" and "ZEONOR" from Zeon Corporation; a product available under the product name "Arton" from JSR Corporation; a product available under the product name "TOPAS" from TICONA; and a product available under the product name "APEL" from Mitsui Chemicals, Inc.

D. Applications of Optical Laminate

The optical laminate of the present invention can be used in various display apparatus. Examples thereof include a liquid crystal display apparatus, an organic electroluminescence (EL) display apparatus, an inorganic electroluminescence (EL) display apparatus, an electron emission display apparatus (e.g., a field emission display apparatus (FED) or a surface-conduction electron-emitter display apparatus (SED)), electronic paper (a display apparatus using electronic ink or an electrophoretic element), a plasma display apparatus, a projection-type display apparatus (e.g., a grating light valve (GLV) display apparatus or a display apparatus having a digital micromirror device (DMD)), and a piezoelectric ceramic display. Each of those display apparatus may be a display apparatus configured to display a two-dimensional image, or may be a stereoscopic display apparatus configured to display a three-dimensional image.

E. Liquid Crystal Display Apparatus

A liquid crystal display apparatus of the present invention includes the optical laminate. Examples of the liquid crystal display apparatus include a transmission-type liquid crystal display apparatus, a semi-transmission-type liquid crystal display apparatus, a reflection-type liquid crystal display apparatus, a direct viewing-type liquid crystal display apparatus, and a projection-type liquid crystal display apparatus.

The liquid crystal display apparatus of the present invention is preferably a reflection-type liquid crystal display apparatus. When the reflection-type liquid crystal display apparatus includes the optical laminate, a liquid crystal display apparatus in which a display image is clearer can be obtained. In addition, the reflection hue and viewing angle characteristic of the liquid crystal display apparatus can be improved. In one embodiment, the reflection-type liquid crystal display apparatus of the present invention can be suitably used as a liquid crystal display apparatus to be used outdoors because the apparatus can efficiently utilize ambient light. In addition, as described above, the liquid crystal display apparatus of the present invention is excellent in reflection hue and viewing angle characteristic. Accordingly, even when the apparatus is used as a large liquid crystal display apparatus, satisfactory viewability can be secured. When the apparatus is used as a large liquid crystal display apparatus, the apparatus may be used as one large display apparatus, or the plurality of liquid crystal display apparatus may be arranged (e.g., 3 apparatus in a longitudinal direction by 4 apparatus in a lateral direction) to provide a large liquid crystal display apparatus. As described above, depolarization or light leakage in the peripheral edge portion of the optical laminate to be used in the reflection-type liquid crystal display apparatus of the present invention tends to be small. Accordingly, the optical laminate can also be suitably used in a large liquid crystal display apparatus. Further, the optical laminate can also be suitably used in a liquid crystal display apparatus that has a small bezel or is bezel-less.

As described above, the liquid crystal display apparatus of the present invention can be used as a large liquid crystal display apparatus. When the apparatus is used as one large liquid crystal display apparatus, the apparatus can be used as, for example, a liquid crystal display apparatus whose display screen has a size of 20 inches or more.

EXAMPLES

The present invention is specifically described below by way of Examples. However, the present invention is not limited by these Examples. Methods of measuring respective characteristics are as described below. The terms "part(s)" and "%" in Examples and Comparative Examples are on a weight basis unless otherwise specified.

(1) Thickness

Measurement was performed with a dial gauge (manufactured by PEACOCK, product name: "DG-205 type pds-2").

(2) Transmittance

The transmittances of polarizers obtained in Examples 1 and 2 and Comparative Example 1 were measured with a spectrophotometer (manufactured by JASCO Corporation, product name: "V-7100"). The transmittances are each a Y value subjected to visibility correction with the two-degree field of view (C light source) of JIS Z 8701-1982. The refractive index of a protective film was 1.50, and the refractive index of the surface of each of the polarizers out of contact with the protective film was 1.53.

(3) Transmittance Parameter

Parallel transmittances at a wavelength of 420 nm and a wavelength of 550 nm were measured in the same manner as in the (2). A transmittance parameter was calculated from the following equation by using the measured values for the parallel transmittances.

$$\text{Transmittance parameter} = T_{420}/T_{550} \quad (1)$$

(4) Hue Parameter

The parallel hue values 'a' and parallel hue values 'b' of the polarizers obtained in Examples 1 and 2 and Comparative Example 1 were measured. The measurement was performed with a spectrophotometer (manufactured by JASCO Corporation, product name: "V-7100"). The hue parameters of the polarizers were calculated from the following equation by using the measured values.

$$\text{Hue parameter} = (a^2 + b^2) \quad (2)$$

(5) Parallel Hue Values 'a' and 'b' Values

The parallel hue values 'a' and parallel hue values 'b' of the polarizers obtained in Examples 1 and 2 and Comparative Example 1 were measured. The measurement was performed with a spectrophotometer (manufactured by JASCO Corporation, product name: "V-7100").

(6) Retardation

The retardations of retardation films obtained in Reference Examples 2 and 3 were measured with AxoScan manufactured by Axometrics, Inc. Measurement wavelengths were 450 nm and 550 nm, and a measurement temperature was 23° C. A film piece measuring 50 mm by 50 mm was cut out of a retardation film and used as a measurement sample.

(7) Refractive Index of Pressure-Sensitive Adhesive

The refractive index of a pressure-sensitive adhesive of Reference Example 1 applied onto a transparent substrate, the pressure-sensitive adhesive being free of light-diffusing fine particles, was measured with an Abbe refractometer (DR-M2, manufactured by Atago Co., Ltd.).

(8) Haze Value

The haze values of light-diffusing layers formed in Examples 3 and 4 and Comparative Example 2 were measured by a method specified in JIS K7136 with a haze meter (manufactured by Murakami Color Research Laboratory Co., Ltd., product name: "HN-150").

(9) Hue Change

The hue change Δab of each of optical laminates obtained in Examples 3 and 4 and Comparative Example 2 was calculated. A brightness meter (manufactured by Topcon Corporation, product name: "SR-UL1") was used in the measurement. The measurement was performed while each of the optical laminates was placed on a reflective plate (manufactured by Toray Advanced Film Co., Ltd., product name: "Cerapeel DMS-X42"). A fluorescent lamp (200 1x: a value measured with an illuminometer IM-5) was arranged so that its output light entered at an angle of 30° relative to the vertical direction of the optical laminate, followed by the irradiation of the optical laminate with the light. The dab was calculated from the following equation by using values for: hues ($a_0$, $b_0$) measured for NBS (a, b) under such a condition that only the reflective plate was irradiated with the light from the fluorescent lamp; and hues ($a_x$, $b_x$) measured therefor under a state in which the optical laminate was placed on the reflective plate. The hue change Δab is preferably 3 or less, more preferably 2.5 or less. A case in which the Δab falls within the range means that the hue of each of the optical laminates is more neutralized.

$$\Delta ab = \sqrt{(a_0 - a_x)^2 + (b_0 - b_x)^2}$$

(10) Contrast

Figure 3A:
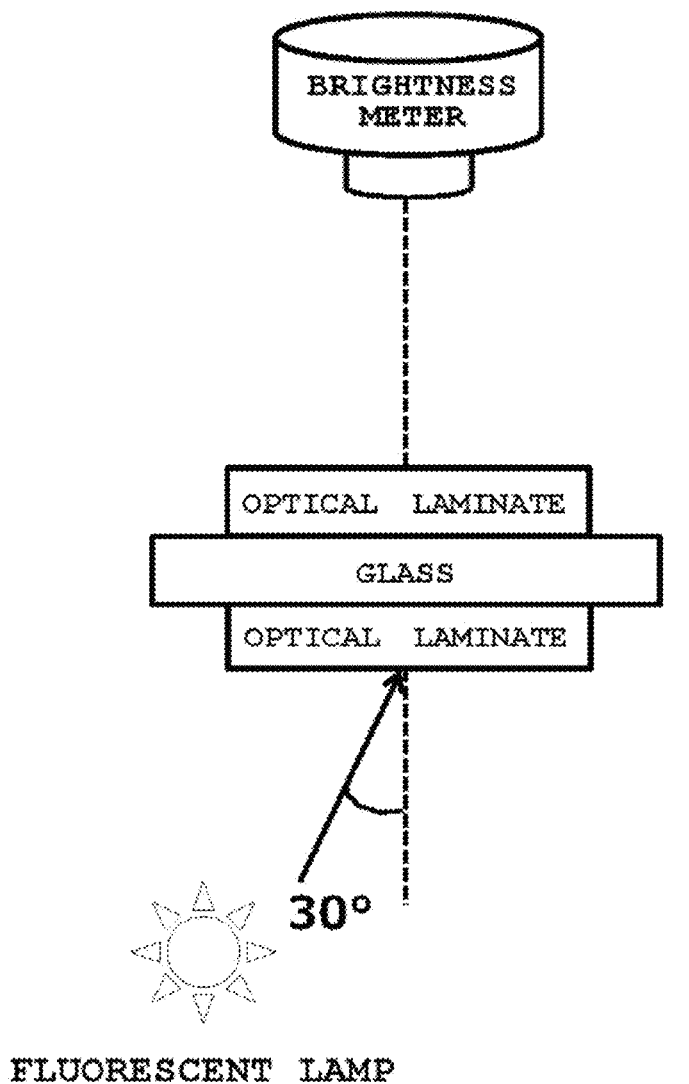
FIG. 3A is a schematic view for illustrating a method of measuring a front white brightness and FIG. 3B is a schematic view for illustrating a method of measuring a front black brightness.

A brightness meter, optical laminates, glass, and a fluorescent lamp were arranged as illustrated in FIG. 3A to measure a front white brightness. More specifically, the optical laminates identical to each other were placed on both surfaces of the glass (thickness: 1.3 μm), and the fluorescent lamp (200 1x: a value measured with an illuminometer IM-5) was arranged so that its light entered at an angle of 30° relative to the vertical direction of one of the optical laminates, followed by the irradiation of the optical laminate with the light. The brightness of light output in the vertical direction of the optical laminate on the side on which the fluorescent lamp was not arranged was measured with the brightness meter (manufactured by Topcon Corporation, product name: "SR-UL1", measurement distance: 500 mm, measurement angle: 2°), and the resultant value was defined as the front white brightness.

Figure 3B:
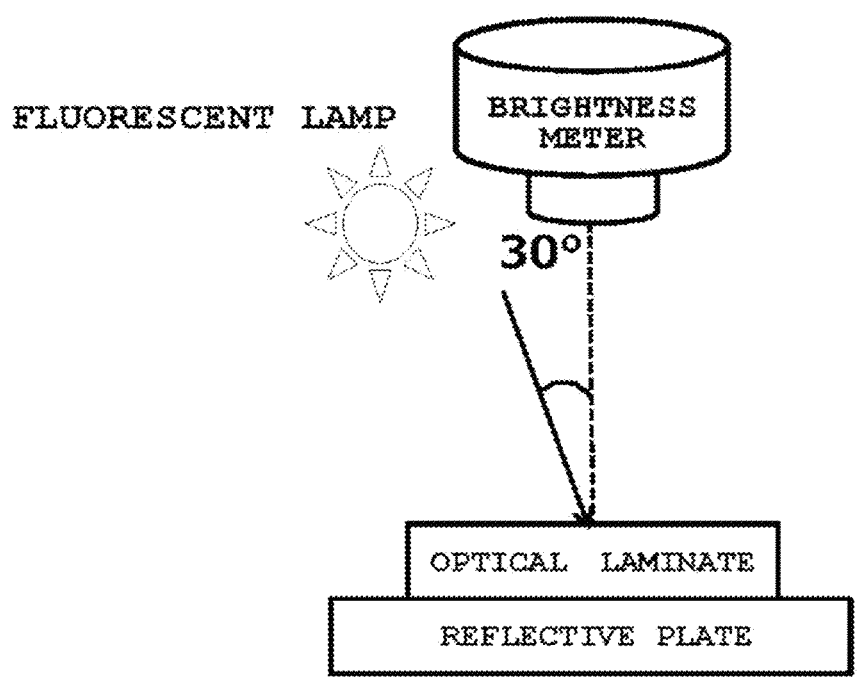

In addition, a brightness meter, an optical laminate, a reflective plate, and a fluorescent lamp were arranged as illustrated in FIG. 3B to measure a black brightness. More specifically, the optical laminate was placed on the reflective plate (manufactured by Toray Advanced Film Co., Ltd., product name: "Cerapeel DMS-X42"), and the above-mentioned fluorescent lamp was arranged so that its light entered at an angle of 30° relative to the vertical direction of the optical laminate, followed by the irradiation of the optical laminate with the light. The brightness of reflected light in the vertical direction was measured with the brightness meter, and the resultant value was defined as a front black brightness.

A contrast ratio was calculated by dividing the measured front white brightness by the front black brightness.

[Example 1] Polarizer Production 1

An amorphous isophthalic acid-copolymerized polyethylene terephthalate film (thickness: 100 μm) having an elongate shape, a water absorption ratio of 0.75%, and a Tg of about 75° C. was used as a thermoplastic resin substrate. One surface of the resin substrate was subjected to corona treatment (treatment condition: 55 W·min/m²).

A PVA aqueous solution (application liquid) was prepared by adding 13 parts by weight of potassium iodide to 100 parts by weight of a PVA-based resin obtained by mixing polyvinyl alcohol (polymerization degree: 4,200, saponification degree: 99.2 mol %) and acetoacetyl-modified PVA (manufactured by the Nippon Synthetic Chemical Industry Co., Ltd., product name: "GOHSEFIMER Z-410") at a ratio of 9:1.

The PVA aqueous solution was applied to the corona-treated surface of the thermoplastic resin substrate, and was dried at 60° C. to form a PVA-based resin layer having a thickness of 13 μm. Thus, a laminate was produced.

The resultant laminate was subjected to free-end uniaxial stretching in an oven at 130° C. between rolls having different peripheral speeds in its longitudinal direction (lengthwise direction) at 2.4 times (in-air auxiliary stretching treatment).

Next, the laminate was immersed in an insolubilizing bath having a liquid temperature of 40° C. (an aqueous solution of boric acid obtained by compounding 100 parts by weight of water with 4 parts by weight of boric acid) for 30 seconds (insolubilizing treatment).

Next, the laminate was immersed in a dyeing bath having a liquid temperature of 30° C. (an aqueous solution of iodine obtained by compounding 100 parts by weight of water with iodine and potassium iodide at a weight ratio of 1:7) for 60 seconds while the iodine concentration of the dyeing bath was adjusted so that the single layer transmittance (Ts) of a polarizer to be finally obtained had any appropriate value (dyeing treatment).

Next, the laminate was immersed in a cross-linking bath having a liquid temperature of 40° C. (an aqueous solution of boric acid obtained by compounding 100 parts by weight of water with 3 parts by weight of potassium iodide and 5 parts by weight of boric acid) for 30 seconds (cross-linking treatment).

After that, while the laminate was immersed in an aqueous solution of boric acid having a liquid temperature of 70° C. (boric acid concentration: 4.0 parts by weight of boric acid with respect to 100 parts by weight of water), the laminate was subjected to uniaxial stretching between rolls having different peripheral speeds in the longitudinal direction (lengthwise direction) so that the total stretching ratio became 5.5 times (underwater stretching treatment).

After that, the laminate was immersed in a washing bath having a liquid temperature of 20° C. (an aqueous solution obtained by compounding 100 parts by weight of water with 4 parts by weight of potassium iodide) (washing treatment).

After that, the laminate was brought into contact with heated rolls made of SUS whose surface temperatures were kept at 75° C. for about 2 seconds while being dried in an oven kept at 70° C. (drying shrinkage treatment). The shrinkage ratio of the laminate in its widthwise direction by the drying shrinkage treatment was 2.5%.

An acrylic film (surface refractive index: 1.50, thickness: 40 μm) was bonded as a protective film to the surface of each polarizer obtained in the foregoing (surface opposite to the resin substrate) through intermediation of a UV-curable adhesive. Specifically, the UV-curable adhesive was applied so that its total thickness became 1.0 μm, followed by the bonding with a roll machine. After that, the adhesive was irradiated with UV light from the protective film side to be cured. Next, the resin substrate was peeled. Thus, 10 polarizing plates each having the configuration "protective film/polarizer" were obtained.

The thickness, transmittance parameter, hue parameter, transmittance, parallel hue a, and parallel hue b of each of the resultant polarizers are shown in Table 1.

TABLE 1

| | Thickness (μm) | Transmittance parameter | Hue parameter | Transmittance (%) | Parallel hue a | Parallel hue b |
|---|---|---|---|---|---|---|
| Example 1-1 | 5 | 0.81 | 4.6 | 40.2 | −1.5 | 4.3 |
| Example 1-2 | 5 | 0.84 | 3.8 | 41.9 | −1.2 | 3.6 |
| Example 1-3 | 5 | 0.86 | 3.1 | 42.4 | −1.5 | 2.7 |
| Example 1-4 | 5 | 0.86 | 3.1 | 43.0 | −1.0 | 2.9 |
| Example 1-5 | 5 | 0.86 | 3.1 | 43.1 | −1.0 | 3.0 |
| Example 1-6 | 5 | 0.86 | 3.1 | 43.3 | −0.9 | 2.9 |
| Example 1-7 | 5 | 0.86 | 3.1 | 43.4 | −0.9 | 2.9 |
| Example 1-8 | 5 | 0.89 | 2.7 | 43.7 | −0.6 | 2.6 |
| Example 1-9 | 5 | 0.89 | 2.7 | 43.8 | −0.7 | 2.7 |
| Example 1-10 | 5 | 0.91 | 2.0 | 44.7 | −0.7 | 1.9 |

[Example 2] Polarizer Production 2

Eight polarizing plates were each obtained in the same manner as in Example 1 except that the PVA aqueous solution (application liquid) was applied so that the thickness of a polarizer to be obtained became 3 μm. The thickness, transmittance parameter, hue parameter, transmittance, parallel hue a, and parallel hue b of each of the resultant polarizers are shown in Table 2.

TABLE 2

| | Thickness (μm) | Transmittance parameter | Hue parameter | Transmittance (%) | Parallel hue a | Parallel hue b |
|---|---|---|---|---|---|---|
| Example 2-1 | 3 | 0.85 | 3.2 | 43.2 | −1.2 | 3.1 |
| Example 2-2 | 2 | 0.86 | 3.1 | 43.4 | −1.1 | 3.0 |
| Example 2-3 | 3 | 0.87 | 2.8 | 43.7 | −0.9 | 2.8 |
| Example 2-4 | 3 | 0.87 | 2.7 | 43.8 | −0.9 | 2.7 |
| Example 2-5 | 3 | 0.87 | 2.7 | 43.9 | −0.9 | 2.7 |
| Example 2-6 | 3 | 0.88 | 2.4 | 44.3 | −0.8 | 2.4 |
| Example 2-7 | 3 | 0.89 | 2.3 | 44.4 | −0.8 | 2.3 |
| Example 2-8 | 3 | 0.89 | 2.3 | 44.5 | −0.8 | 2.2 |

(Comparative Example 1) Polarizer Production 3

While a polyvinyl alcohol-based film (PVA film) having a thickness of 75 μm (manufactured by Kuraray Co., Ltd., product name: "VF-PS-N #7500") was immersed in hot water having a liquid temperature of 25° C. (swelling bath) to be swollen, the film was stretched in a flow direction so that a stretching ratio became 2.4 times with respect to its original length.

Next, while the film was immersed in a dyeing bath having a liquid temperature of 30° C. (an aqueous solution of iodine having added thereto an iodide at a weight ratio "iodine:potassium iodide" of 1:7) for 60 seconds to be dyed, the film was stretched in the flow direction so that a stretching ratio became 3.3 times with respect to the original length. In addition, the transmittance of a polarizer to be obtained was adjusted by changing the iodine content of the dyeing bath from 0.03 part by weight to 0.1 part by weight with respect to 100 parts by weight of water.

Next, the film was immersed in an aqueous solution having a liquid temperature of 30° C. (an aqueous solution obtained by compounding 100 parts by weight of water with 4 parts by weight of boric acid and 3 parts by weight of potassium iodide) for 30 seconds.

Next, while the film was immersed in a stretching bath having a liquid temperature of 60° C. (an aqueous solution obtained by compounding 100 parts by weight of water with 4 parts by weight of boric acid and 5 parts by weight of potassium iodide) for 40 seconds, the film was stretched in the flow direction so that a stretching ratio became 6 times with respect to the original length.

Next, the film was immersed in a washing bath having a liquid temperature of 30° C. (an aqueous solution obtained by compounding 100 parts by weight of water with 3 parts by weight of potassium iodide) for 10 seconds to be washed. Further, the film was dried at 50° C. for 4 minutes to provide a polarizer.

Subsequently, an aqueous solution of a PVA-based resin (manufactured by the Nippon Synthetic Chemical Industry Co., Ltd., product name: "GOHSEFIMER (trademark) Z-200", resin concentration: 3 wt %) was applied to the surface of the resultant polarizer, and a protective film (thickness: 25 µm) was bonded thereto. The resultant was heated in an oven maintained at 60° C. for 5 minutes to provide a polarizing plate (polarizer (transmittance: 42.3%, thickness: 30 µm)/protective film). The thickness, transmittance parameter, hue parameter, transmittance, parallel hue a, and parallel hue b of each of the resultant polarizers are shown in Table 3.

TABLE 3

|  | Thickness (µm) | Transmittance parameter | Hue parameter | Transmittance (%) | Parallel hue a | Parallel hue b |
|---|---|---|---|---|---|---|
| Comparative Example 1-1 | 30 | 0.74 | 5.7 | 43.3 | −1.0 | 5.6 |
| Comparative Example 1-2 | 30 | 0.74 | 5.7 | 43.4 | −1.9 | 5.4 |
| Comparative Example 1-3 | 30 | 0.76 | 5.3 | 43.5 | −1.7 | 4.9 |

Evaluation

The polarizers obtained in Examples 1 and 2 each had a transmittance parameter of 0.8 or more and a hue parameter of 5 or less, and hence were each a polarizer having a neutralized hue. Further, the hue was neutralized without being affected by the transmittance of the polarizer. In addition, each of the polarizers had a small thickness, and hence was able to reduce the thickness of a display apparatus using the polarizer.

[Reference Example 1] Production of Light-Diffusing Pressure-Sensitive Adhesive

An application liquid of a light-diffusing pressure-sensitive adhesive (solid content: 13.2%) was prepared by compounding 100 parts of the solid content of an acrylic polymer solution with 0.6 part of an isocyanate cross-linking agent (manufactured by Nippon Polyurethane Industry Co., Ltd., product name: "CORONATE L") and 29 parts of silicone resin fine particles (manufactured by Momentive Performance Materials Inc., product name: "TOSPEARL 145", volume-average particle diameter: 4 µm) serving as light-diffusible fine particles.

[Reference Example 2] Production of Retardation Film 1

Polymerization was performed with a batch polymerization apparatus formed of two vertical reactors each including a stirring blade and a reflux condenser controlled to 100° C. 9,9-Bis[4-(2-hydroxyethoxy)]phenyl fluorene (BHEPF), isosorbide (ISB), diethylene glycol (DEG), diphenyl carbonate (DPC), and magnesium acetate tetrahydrate were loaded into the apparatus so that a molar ratio "BHEPF/ISB/DEG/DPC/magnesium acetate" became 0.348/0.490/0.162/1.005/1.00×10$^{-5}$. After each of the reactors had been sufficiently purged with nitrogen (oxygen concentration: from 0.0005 vol % to 0.001 vol %), the warming of reactors was performed with a heating medium, and at the time point when a temperature in each of the reactors (internal temperature) became 100° C., the stirring of the mixture was initiated. 40 Minutes after the initiation of the temperature increase, the internal temperature was caused to reach 220° C., and such control that the temperature was held was performed. At the same time, a pressure reduction was initiated to set a pressure in each of the reactors to 13.3 kPa 90 minutes after the temperature had reached 220° C. Phenol vapor produced as a by-product in association with the polymerization reaction was introduced into the reflux condenser at 100° C. A monomer component present in a slight amount in the phenol vapor was returned to the reactors, and phenol vapor that was not condensed was introduced into a condenser at 45° C. and recovered.

Nitrogen was introduced into the first reactor to return the pressure therein to an atmospheric pressure once. After that, an oligomerized reaction liquid in the first reactor was transferred to the second reactor. Next, an increase in temperature in the second reactor and a reduction in pressure therein were initiated to set the internal temperature and the pressure to 240° C. and 0.2 kPa, respectively in 50 minutes. After that, the polymerization was advanced until predetermined stirring power was obtained. At the time point when the predetermined power was achieved, nitrogen was introduced into the second reactor to return the pressure to the atmospheric pressure, and the reaction liquid was extracted in the form of a strand and pelletized with a rotary cutter to provide a polycarbonate resin A having the following copolymer composition: BHEPF/ISB/DEG=34.8/49.0/16.2 [mol %]. The polycarbonate resin had a reduced viscosity of 0.430 dL/g and a glass transition temperature of 128° C.

The resultant polycarbonate resin was vacuum-dried at 80° C. for 5 hours. After that, a polycarbonate resin film having a thickness of 130 µm was produced from the vacuum-dried product with a film-producing apparatus including a uniaxial extruder (manufactured by Isuzu Kakoki, screw diameter: 25 mm, cylinder preset temperature: 220° C.), a T-die (width: 900 mm, preset temperature: 220° C.), a chill roll (preset temperature: 125° C.), and a winding machine.

(Oblique Stretching)

The polycarbonate resin film obtained as described above was subjected to oblique stretching by a method in conformity with Example 1 of Japanese Patent Application Laid-open No. 2014-194483 to provide a retardation film. With regard to the detailed configuration of a stretching apparatus, the description of Japanese Patent Application Laid-open No. 2014-194483 is incorporated herein by reference. A specific production procedure for the retardation film is as described below. The polycarbonate resin film (thickness: 130 μm, width: 765 mm) was preheated to 142° C. in the preheating zone of the stretching apparatus. In the preheating zone, the clip pitches of left and right clips were 125 mm. Next, simultaneously with the entry of the film into a first oblique stretching zone C1, an increase in clip pitch of the right clips was initiated, and the clip pitch was increased from 125 mm to 177.5 mm in the first oblique stretching zone C1. A clip pitch change ratio was 1.42. In the first oblique stretching zone C1, a reduction in clip pitch of the left clips was initiated, and the clip pitch was reduced from 125 mm to 90 mm in the first oblique stretching zone C1. A clip pitch change ratio was 0.72. Further, simultaneously with the entry of the film into a second oblique stretching zone C2, an increase in clip pitch of the left clips was initiated, and the clip pitch was increased from 90 mm to 177.5 mm in the second oblique stretching zone C2. Meanwhile, the clip pitch of the right clips was maintained at 177.5 mm in the second oblique stretching zone C2. In addition, simultaneously with the oblique stretching, the film was also stretched in its widthwise direction at 1.9 times. The oblique stretching was performed at 135° C.

(MD Shrinkage Treatment)

Next, a MD shrinkage treatment was performed in a shrinkage zone. Specifically, both the clip pitches of the left clips and the right clips were reduced from 177.5 mm to 165 mm. A shrinkage ratio in the MD shrinkage treatment was 7.0%.

Thus, a retardation film 1 (thickness: 50 μm) was obtained. The resultant retardation film had an Re(550) of 141 nm and showed a reverse dispersion characteristic.

[Reference Example 3] Production of Retardation Film 2

A cycloolefin-based retardation film A (manufactured by Kaneka Corporation, product name: "KUZ-FILM #270," thickness: 33 μm, Re(550)=270 nm, Re(450)/Re(550)=1.00, Nz coefficient=1.00) and a cycloolefin-based retardation film B (manufactured by Kaneka Corporation, product name: "KUZ-FILM #140," thickness: 28 μm, Re(550)=140 nm, Re(450)/Re(550)=1.00, Nz coefficient=1.00) were bonded to each other through intermediation of a light-diffusing pressure-sensitive adhesive layer having a thickness of 23 μm (light-diffusing pressure-sensitive adhesive composition obtained in Reference Example 1) so that an angle formed by their respective slow axes became 60°. Thus, a retardation film 2 was produced.

[Example 3] Production of Optical Laminate 1

The light-diffusing pressure-sensitive adhesive composition obtained in Reference Example 1 was applied to the polarizer side of the polarizing plate including the polarizer obtained in Example 1 and having a transmittance of 43.4% (the polarizer of Example 1-7) so that its thickness after drying became 23 μm. Thus, a light-diffusing pressure-sensitive adhesive layer was formed. The retardation film obtained in Reference Example 2 was arranged on and bonded to the layer so that an angle formed by the slow axis of the retardation film and the absorption axis of the polarizer became 45°. Next, the light-diffusing pressure-sensitive adhesive composition was applied to the surface of the retardation film to which the polarizer was not bonded so that its thickness after drying became 23 μm. Thus, another light-diffusing pressure-sensitive adhesive layer was formed. After that, the layers were dried and cured. Thus, an optical laminate 1 was obtained.

The resultant optical laminate had a Lab of 2.2 and a contrast ratio of 263. In addition, the light-diffusing pressure-sensitive adhesive layers each had a haze of 95.1%.

[Example 4] Production of Optical Laminate 2

The light-diffusing pressure-sensitive adhesive composition obtained in Reference Example 1 was applied to the polarizer side of the polarizing plate including the polarizer obtained in Example 2 and having a transmittance of 43.4% (the polarizer of Example 2-2) so that its thickness after drying became 23 μm. Thus, a light-diffusing pressure-sensitive adhesive layer was formed. The retardation film obtained in Reference Example 3 was bonded to the layer. Thus, an optical laminate 2 was obtained.

The resultant optical laminate had a $\Delta$ab of 2.1 and a contrast ratio of 260. In addition, the light-diffusing pressure-sensitive adhesive layers each had a haze of 95.1%.

(Comparative Example 2) Production of Optical Laminate C1

An optical laminate C1 was obtained in the same manner as in Example 3 except that the polarizing plate including the polarizer obtained in Comparative Example 1 and having a transmittance of 43.4% (the polarizer of Comparative Example 1-2) was used as a polarizer.

The resultant optical laminate had a Lab of 4.6 and a contrast ratio of 259. In addition, the light-diffusing pressure-sensitive adhesive layers each had a haze of 95.1%.

Evaluation

Each of the optical laminates obtained in Examples 3 and 4 had a high contrast ratio and was excellent in reflection hue. The optical laminate of Comparative Example 2 had a high contrast ratio but was susceptible to improvement in terms of its reflection hue.

The polarizer of the present invention can be suitably used in display apparatus, such as a liquid crystal display apparatus, an organic electroluminescence (EL) display apparatus, an inorganic electroluminescence (EL) display apparatus, an electron emission display apparatus (e.g., a field emission display apparatus (FED) or a surface-conduction electron-emitter display apparatus (SED)), electronic paper (a display apparatus using electronic ink or an electrophoretic element), a plasma display apparatus, a projection-type display apparatus (e.g., a grating light valve (GLV) display apparatus or a display apparatus having a digital micromirror device (DMD)), and a piezoelectric ceramic display.

What is claimed is:

1. A polarizer having a transmittance parameter represented by the equation (1) of 0.8 or more and a hue parameter represented by the equation (2) of 5 or less:

$$\text{Transmittance parameter} = T_{420}/T_{550} \quad (1)$$

in the equation (1), $T_{420}$ represents a parallel transmittance at a wavelength of 420 nm and $T_{550}$ represents a parallel transmittance at a wavelength of 550 nm;

$$\text{Hue parameter} = \sqrt{(a^2+b^2)} \quad (2)$$

in the equation (2), a represents a parallel hue value 'a' and b represents a parallel hue value 'b',
the polarizer has a thickness of 8 μm or less.

2. The polarizer according to claim 1, wherein the polarizer contains iodine as a dichroic substance.

3. A method of producing the polarizer of claim 2, the method comprising subjecting a laminate of a thermoplastic resin substrate and a polyvinyl alcohol-based resin layer to in-air stretching treatment, dyeing treatment, underwater stretching treatment, and drying shrinkage treatment in the stated order,
wherein a shrinkage ratio of the laminate in a widthwise direction by the drying shrinkage treatment is 1% or more, and
the polyvinyl alcohol-based resin layer comprises a halide and a polyvinyl alcohol-based resin.

4. An optical laminate, comprising:
the polarizer of claim 1;
a retardation layer configured to function as a λ/4 plate; and
a light-diffusing layer.

5. The optical laminate according to claim 4, wherein the light-diffusing layer contains a pressure-sensitive adhesive and light-diffusing fine particles.

6. The optical laminate according to claim 5, wherein the light-diffusing fine particles have an average particle diameter of from 2 μm to 5 μm.

7. A liquid crystal display apparatus, comprising the optical laminate of claim 6.

8. The liquid crystal display apparatus according to claim 7, wherein the liquid crystal display apparatus comprises a reflection-type liquid crystal display apparatus.

9. A liquid crystal display apparatus, comprising the optical laminate of claim 5.

10. The liquid crystal display apparatus according to claim 9, wherein the liquid crystal display apparatus comprises a reflection-type liquid crystal display apparatus.

11. A liquid crystal display apparatus, comprising the optical laminate of claim 4.

12. The liquid crystal display apparatus according to claim 11, wherein the liquid crystal display apparatus comprises a reflection-type liquid crystal display apparatus.

13. A method of producing a polarizer having a transmittance parameter represented by the equation (1) of 0.8 or more and a hue parameter represented by the equation (2) of 5 or less:

$$\text{Transmittance parameter} = T_{420}/T_{550} \quad (1)$$

in the equation (1), $T_{420}$ represents a parallel transmittance at a wavelength of 420 nm and $T_{550}$ represents a parallel transmittance at a wavelength of 550 nm;

$$\text{Hue parameter} = \sqrt{(a^2+b^2)} \quad (2)$$

in the equation (2), a represents a parallel hue value 'a' and b represents a parallel hue value 'b', the polarizer has a thickness of 8 μm or less,
the method comprising subjecting a laminate of a thermoplastic resin substrate and a polyvinyl alcohol-based resin layer to in-air stretching treatment, dyeing treatment, underwater stretching treatment, and drying shrinkage treatment in the stated order,
wherein a shrinkage ratio of the laminate in a widthwise direction by the drying shrinkage treatment is 1% or more, and
the polyvinyl alcohol-based resin layer comprises a halide and a polyvinyl alcohol-based resin.

* * * * *

UNITED STATES PATENT AND TRADEMARK OFFICE
CERTIFICATE OF CORRECTION

PATENT NO. : 11,269,212 B2
APPLICATION NO. : 16/127585
DATED : March 8, 2022
INVENTOR(S) : Takehito Fuchida et al.

It is certified that error appears in the above-identified patent and that said Letters Patent is hereby corrected as shown below:

On the Title Page

Change:
Item (71) Applicant: NITTO DENKO CORPOTATION, Baraki (JP)
To be:
Item (71) Applicant: NITTO DENKO CORPORATION Ibaraki-shi, Osaka (JP)

Change:
Item (72) Inventors: Takehito Fuchida, Ibaraki (JP)
　　　　　Shusaku Goto, Ibaraki (JP)
　　　　　Katsunori Takada, Ibaraki (JP)
　　　　　Yoshitsugu Kitamura, Ibaraki (JP)
To be:
Item (72) Inventors: Takehito Fuchida, Ibaraki-shi (JP)
　　　　　Shusaku Goto, Ibaraki-shi (JP)
　　　　　Katsunori Takada, Ibaraki-shi (JP)
　　　　　Yoshitsugu Kitamura, Ibaraki-shi (JP)

Change:
Item (73) Assignee: NITTO DENKO CORPOTATION, Ibaraki (JP)
To be:
Item (73) Assignee: NITTO DENKO CORPORATION, Ibaraki-shi, Osaka (JP)

Signed and Sealed this
Twentieth Day of September, 2022

Katherine Kelly Vidal
*Director of the United States Patent and Trademark Office*